United States Patent [19]

Kohyama et al.

[11] 4,224,093

[45] Sep. 23, 1980

[54] METHOD FOR PRODUCING LIQUID CRYSTAL DISPLAY ELEMENTS

[75] Inventors: Masaharu Kohyama; Tadashi Ishibashi; Rokuro Watanabe, all of Mobara, Japan

[73] Assignee: Hitachi, Ltd., Japan

[21] Appl. No.: 44,380

[22] Filed: Jun. 1, 1979

[30] Foreign Application Priority Data

Jun. 2, 1978 [JP] Japan ................... 53/65826

[51] Int. Cl.² ............................................. B32B 7/00
[52] U.S. Cl. ..................... 156/99; 156/101; 156/250; 428/44; 428/45
[58] Field of Search .......................... 428/1, 44, 45, 35; 156/65, 99, 101, 250

[56] References Cited

U.S. PATENT DOCUMENTS 4,157,932  6/1979  Hirata ........................................ 428/1

Primary Examiner—Marion McCamish
Attorney, Agent, or Firm—Craig & Antonelli

[57] ABSTRACT

A method for producing liquid crystal cells is disclosed, in which a pair of large-area glass substrates are put together, opposite to each other and spaced a small distance apart from each other to form integrally a plurality of liquid crystal cells between the substrates, and by splitting the glass substrate assembly, the individual cells are separated from one another. Each of the glass substrates, which have the same structure, has first regions to serve as upper substrate sections and second regions to serve as lower substrate sections disposed alternately thereon and predetermined electrodes are formed on the first and the second regions. The two glass substrates are disposed face to face with each other in such a manner that the first and the second regions of one substrate are opposite to the second and the first regions of the other substrate. The splitting operation is performed by placing the glass substrate assembly on two parallel supports and by subjecting the assembly to bending distortion by applying a pressing force. The pressing force is determined depending on the relationship between the distance between the supports and the degree of the bending distortion.

3 Claims, 8 Drawing Figures

METHOD FOR PRODUCING LIQUID CRYSTAL DISPLAY ELEMENTS

This invention relates to a method for producing liquid crystal display elements, according to which a multiplicity of liquid crystal display elements are defined between two large-area glass plates disposed parallel to each other and the individual elements are obtained by separating them from one another through spliting the glass plates.

In the conventional process of fabrication, a pair of glass plates having a desired size are provided with transparent electrodes having desired patterns and the space defined between the glass plates is filled with a liquid crystal to form a signal liquid crystal display elements, one by one. However, the recent demands for miniature-sized alphanumeric display elements such as used for digital wrist watches and table calculators cannot be satisfied by such a so-called one-at-a-time fabrication method. The necessity for the use of a large number of such elements gives rise to a need for a certain advanced method, or especially a so-called mass production fabrication method, such as disclosed in Japanese patent application Laid-Open No. 80852/77 in which a pair of large-area glass plates are prepared each of which is provided with plural sets of transparent electrodes on the corresponding surface portions of the glass plate, a plurality of liquid crystal cells are formed at one time between the paired glass plates disposed in parallel with and in close proximity to each other, and a plurality of liquid crystal display elements are obtained at a time by splitting the glass plates into units of liquid crystal display elements. According to this mass production fabrication method, however, one of the pair of glass plates is specified as the upper substrate for liquid crystal display elements juxtaposed in the same orientation while the other is so fabricated as to serve only as the lower substrate for the elements. Accordingly, portions of the glass plate serving as the lower substrate, i.e. marginal portions of the individual liquid crystal cell units, will have to be discarded when the integrally formed elements are split into a plurality of cell units. This lowers the utility factor of the raw materials for the lower substrate. Moreover, scratches are formed corresponding to predetermined split lines on the glass substrates before the splitting step and the splitting is effected along these scratches. However, since the marginal portions to be discarded usually have a very small width of, e.g. 0.5–3 mm, splitting away the marginal portion cannot always be effected exactly along the scratch, but often deviates from the split line so that some cells are damaged to decrease the yield in production.

The method of splitting a plurality of liquid crystal cells integrally fabricated into individual units is disclosed in, for example, Japanese patent application Laid-Open No. 80855/77 in which before assembling a pair of large-area glass plates scratches are formed corresponding to predetermined split lines in the surface of one of the two glass plates on which surface transparent electrodes are formed (this surface is hereafter referred to as the inner surface), while after assemblage similar scratches are formed corresponding to predetermined split lines in the surface of the other glass substrate which surface is opposite to the surface of the other glass substrate with desired electrodes formed thereon (this surface with no electrode is hereafter referred to as the outer surface), and thereafter the assembly of the glass plates is split into liquid crystal cell units by the application of mechanical force to suitable points on the surface of the assembly. However, the scratches cut by, for example, a glass-cutter in the inner surface of the glass substrate may often disappear at the time of splitting because the time from the step of scratching to the step of splitting is relatively long or because a step of sealing with bonding agent under high temperature is effected between the scratching step and splitting step. Furthermore, there arises another drawback. Namely, in the step of assembling the glass substrates, bonding agent for hermetic sealing may fill the scratches or flow over the scratches formed in the inner surface of the substrate so that the splitting of the assembly of the glass substrates cannot be carried out along the scratches or predetermined split lines, which results in failure to obtain a desired shape or a correct dimension of the liquid crystal cell unit.

Another splitting method is disclosed in, for example, Japanese patent application Laid-Open No. 83245/77 in which grooves are formed, before assembly of a pair of glass substrates in the inner surface of one of the glass substrates, this substrate is then split after assembly by the application of a high-speed grindstone to these positions on the outer surface of the glass substrate which correspond to the grooves on the inner surface thereof, and thereafter the other glass substrate is subjected to a splitting operation. This method has a drawback that there is a need for the steps of forming the grooves and splitting the glass substrate by the grindstone. This need increases the number of the fabrication steps and therefore the production costs. This method also has another drawback that the time required for splitting is relatively long. The grooves are usually formed by a high-speed grindstone in this case and the speed of cutting for splitting by the high-speed grindstone is at most about 1 cm/sec. Therefore, use of the high-speed grindstone both for groove forming and for splitting involves a relatively long time for splitting. The formation of the grooves in the inner surface of one of the substrates is for preventing the transparent electrodes formed on the inner surface of the other substrate from being damaged by the grindstone which might be brought in close proximity to the inner surface of the other substrate for a complete cut if the grooves are not formed. Namely, the grooves formed in the inner surface of the substrate serve to exclude necessity of close proximity of the grindstone to the inner surface of the other substrate for complete cut of the substrate.

The object of this invention, which has been made to eliminate the above mentioned drawbacks inherent to the conventional method, is to provide a method for producing liquid crystal display elements, according to which a material saving can be attained, a high workability can be achieved and the produced elements are very accurate in dimensions.

According to this invention, there is provided a method for producing liquid crystal display elements, comprising the steps of: defining, with at least one boundary line, first regions and second regions disposed alternately on the surface of a glass substrate; forming transparent electrode segments having desired patterns on the first regions, and forming transparent electrodes having desired shapes on the second regions; forming layers of bonding agent, the layers having a predetermined width and thickness and extending within the second regions along the boundary line and the edge of the glass substrate; combining the glass substrate with another glass substrate prepared through all the above mentioned steps in such a manner that one substrate is kept at a predetermined distance from another and that the first regions of the one substrate are opposite to the second regions of said other substrate while the second regions of the one substrate are opposite to the first regions of the other substrate; forming a glass substrate assembly by bonding the glass substrates together through a heat treatment of the bonding agent; forming linear scratches in the surfaces of the glass substrates, the surfaces having no electrode formed thereon and the linear scratches corresponding in position to the boundary lines; splitting the substrates along the linear scratches; and filling the spaces enclosed by the glass substrates and the bonding agent layers, with liquid crystal.

Now, this invention will be described by way of an embodiment with reference to the attached drawings, in which.

Figure 1:
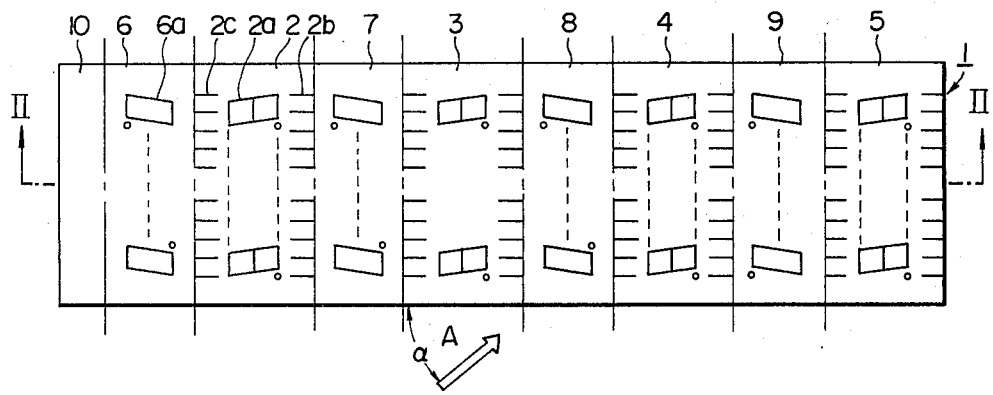
FIG. 1 is a plan view of a glass substrate with transparent electrodes formed thereon, provided according to an embodiment of this invention.
Figure 2:
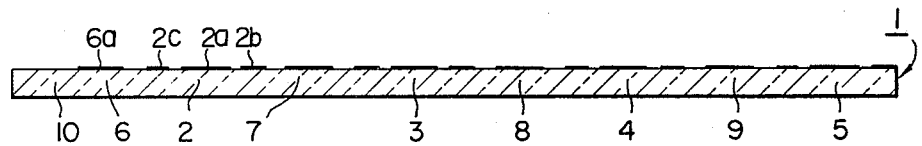
FIG. 2 is a cross sectional view taken along line II—II in FIG. 1.

In FIGS. 1 and 2, a glass substrate 1 comprises four upper substrate sections 2, 3, 4 and 5 for serving as the upper substrates of individual liquid crystal cells; four lower substrate sections 6, 7, 8 and 9 for serving as the lower substrates of the respective cells; and an end portion 10, the upper and lower substrate sections being alternately arranged. The boundaries between the upper and lower substrate sections and between the end portion and the lower substrate section are predetermined split lines along which the glass substrate 1 is split later. On the upper substrate section 2 are formed transparent segment electrodes 2a for constituting desired patterns and transparent terminals 2b and 2c. The segment electrodes 2a and the associated terminals 2b and 2c are connected with each other by means of conductor lines (not shown). The segment electrodes 2a and the terminals 2b and 2c are formed of transparent conductive film through, for example, photoetching technique. The same transparent segment electrodes and transparent terminals are formed also on the other upper substrate sections 3, 4 and 5. On the lower substrate section 6 are formed common electrodes 6a and conductor leads (not shown) connected with the common electrodes. The common electrodes 6a and the conductor leads are formed of transparent conductive film through photoetching technique or any other suitable method. The same common electrodes and conductor leads are formed also on the other lower substrate sections 7, 8 and 9 through the same technique.

The conductor leads formed on each lower substrate section serves to connect the common electrodes with the terminals when the lower substrate section is later combined with an upper substrate section to form a liquid crystal cell. Article symbols and/or marks used for the exact registration of patterns may be introduced in the end portion 10.

A transparent protective film of, for example, $SiO_2$ is formed on the surface of the glass substrate 1 where the transparent electrodes and terminals are formed, so that the electrodes and the terminals are completely covered by the transparent protective film. In this case, the film of $SiO_2$ is formed by the oblique vapor-deposition in the direction indicated by an arrow A so as to be treated for orientating the molecules of liquid crystal in a predetermined direction in the plane parallel to the surface of the substrate 1. Such a treatment of the $SiO_2$ film for liquid crystal molecule orientation may be performed by a rubbing treatment in the direction of the arrow A after the film of $SiO_2$ has been formed.

Figure 3:
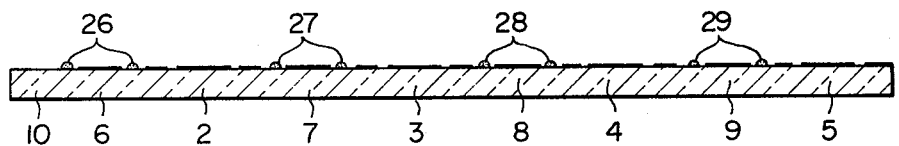
FIG. 3 is a cross sectional view similar to FIG. 2 in which layers of bonding agent are formed on the glass substrate.

As shown in FIG. 3, layers 26, 27, 28 and 29 of bonding agent for sealing are deposited on the lower substrate sections 6, 7, 8 and 9 of the glass substrate 1 through, for example, printing technique. Each of the bonding agent layers 26, 27, 28 and 29 forms a closed rectangular loop with its pair of sides parallel to the edges of the glass substrate and with its other pair of sides parallel to and spaced a predetermined distance from the split lines.

Figure 4:
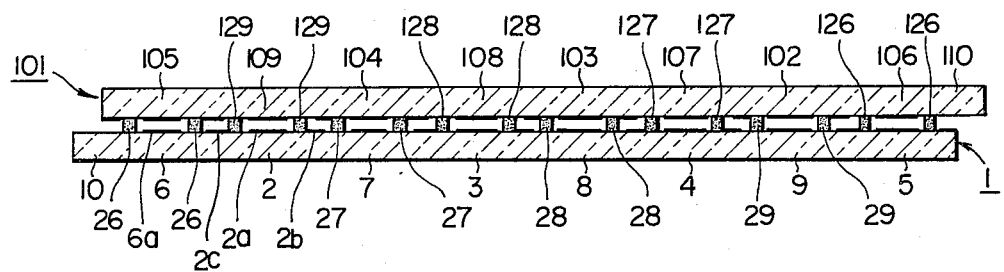
FIG. 4 shows in cross section how the glass substrates are assembled.

As shown in FIG. 4, another glass substrate 101 prepared through the same process as described above and having the same configuration as the substrate 1 is disposed on the glass substrate 1 with their inner surfaces (on which the transparent electrodes are formed) facing each other. The relative positions of the substrates 1 and 101 with respect to each other are such that the segment electrodes on the upper substrate sections 2, 3, 4 and 5 of the substrate 1 may be opposite respectively to the common electrodes on the lower substrate sections 109, 108, 107 and 106 of the substrate 101, and that the common electrodes on the lower substrate sections 6, 7, 8 and 9 of the substrate 1 may be opposite respectively to the segment electrodes on the upper substrate sections 105, 104, 103 and 102 of the substrate 101. In this case, the angle between the directions of the treatments for liquid crystal molecule orientation in the substrates 1 and 101 is set equal to twice $\alpha$, e.g. 80°–100°, $\alpha$ representing the angle which the direction of the treatment in each substrate makes with respect to the substrate as shown in FIG. 1.

The glass substrates 1 and 101, put together, are subjected to heat treatment so that the bonding agent layers 26, 27, 28 and 29 and 126, 127, 128 and 129 are hardened and thermally bonded to the substrates to form a glass substrate assembly.

Figure 5:
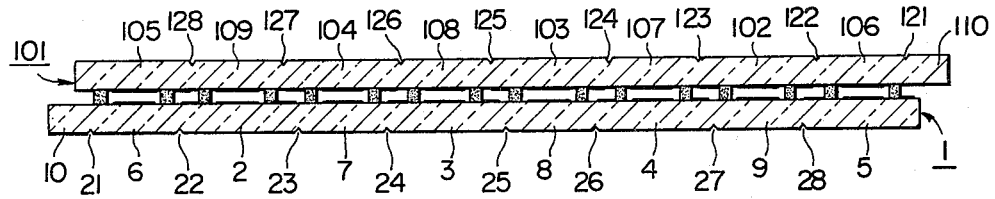
FIG. 5 shows in cross section scratches formed in the outer surfaces of the glass substrates.

As shown in FIG. 5, linear scratches 21–28 and 121–128 are formed in the outer surfaces of the glass substrates 1 and 101, corresponding to the split lines, by means of a diamond cutter or a roller of SiC or the like.

Figure 6:
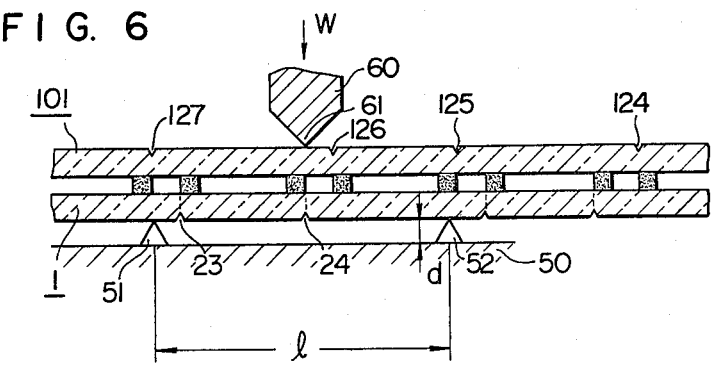
FIG. 6 shows on an enlarged scale a part of the structure shown in FIG. 5 for explaining the splitting operation.

After forming the scratches, as shown in FIG. 6, the glass substrate assembly is placed on a supporting apparatus having a flat table 50 and supports 51 and 52 thereon, and a pressing force is applied by means of a pressing device 60 resting on the outer surface of one of the substrates and above or nearly above one of the scratches formed in the outer surface of the other substrate. The longitudinal axes of the supports 51 and 52 are parallel to the split lines and therefore to the scratches. In FIG. 6, there is shown a case where the pressing force is applied onto the outer surface of the substrate 101 at the position corresponding to the scratch 24 of the substrate 1. The pressing force causes a bending distortion in the assembly so that the stress concentrated in the scratch generates a break leading to the splitting of the substrate 1 along the split line. The bending distortion of the glass substrate assembly is restricted by the surface of the table 50 and hence limited to the height of the supports 51 and 52. This splitting operation is continued by shifting the assembly laterally to perform the splitting along all the split lines and the substrate 1 is split into eight sections and the end portion 10. Next, the assembly is placed on the supporting apparatus upside down and the same operation is performed to split the substrate 101. As a result, there are obtained eight liquid crystal cell units.

The scratch 24 is located at about the midpoint between the supports 51 and 52 and the supports 51 and 52 are prevented from being located at any scratch. It is necessary that there should be less than three scratches within a distance of 1 (cm) between the supports 51 and 52. Under this condition, it can be avoided that an already split or cut portion exists within the distance of 1 when the splitting operation is effected for a desired one of the scratches.

The end portions 10 and 110 are discarded. Liquid crystal is injected into each of the separated cell units through an opening 130 provided in the bonding agent layer and a liquid crystal cell is completed by sealing the opening with a bonding agent or soldering material. The glass substrates 1 and 101 are very effectively utilized since only the end portions 10 and 110 are discarded. This leads to an improved material saving and the material utility factor is much increased. This leads also to the reduction in production cost.

The pressure device 60 may be made of, for example, elastic substance such as hard rubber and its end 61 is urged against the outer surface of the glass substrate. The pressure device 60 thus contacts almost linearly with the outer surface. It has been revealed that the splitting along the split lines can be performed at high precision if the parameters l, W and d are specifically related to one another, where W designates the pressing force Kg per unit length (in cm) of the scratch, applied by the pressure device 60, d the height in cm of the supports 51 and 52 and l the distance in cm between the supports 51 and 52. According to the Inventors' experiments, the high precision splitting could be achieved if $$0.6 < l \times W < 5.0$$

and $$75 < l/d < 100.$$

When $l \times W > 5.0$, the splitting of the substrate 1 was accompanied by a break of the substrate 101 at an undesirable portion. On the other hand, if $l \times W < 0.6$, the substrate 1 was not always cut along the scratch. Moreover, if $l/d < 75$, the splitting of the substrate 1 caused also an undesirable break of the substrate 101, while the substrate 1 could not be cut even along the scratch 24 if $l/d > 100$. All the numerical data obtained above was associated with a substrate of soda lime glass plate having a thickness of 0.7–1.2 mm, used for almost all the types of liquid crystal cells. It is noted that the deviation of the position of the end 61 of the pressure device 60 from the scratch 24 in the direction perpendicular to the scratch 24 and along the outer surface of the substrate is kept within 1 mm. As regards the thus split liquid crystal cells, the surfaces of the split sides of the substrate were almost perpendicular to the substrate surfaces and the unevenness of the dimensions due to the splitting showed a normal distribution; that is, the yield of cells having a dimensional precision within ± 0.15 mm amounted to 99.8%, and those with a precision within ± 0.1 mm to 97.8%. Incidentally, the dimensional precision attained by the splitting the same substrate with a glass-cutter is at best ± 0.5 mm.

Figure 7:
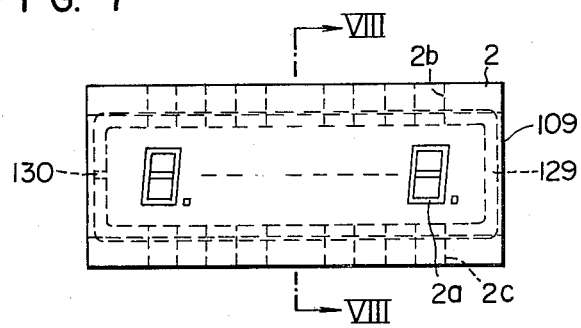
FIG. 7 shows in front view a liquid crystal display element.
Figure 8:
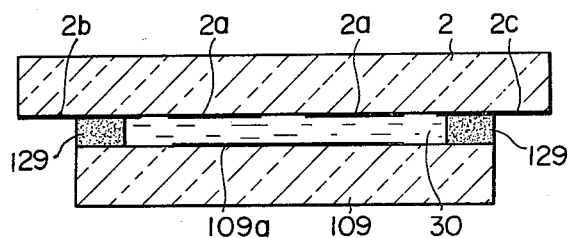
FIG. 8 is a cross sectional view taken along line VIII—VIII in FIG. 7.

FIG. 7 shows in front view a liquid crystal cell and FIG. 8 is a cross section taken alone line VIII—VIII in FIG. 7. The bonding agent 129 forms a continuous sealing, with the opening 130, along the edge of the lower substrate 109 and the space defined by the enclosure is filled with liquid crystal 30. The terminals 2b and 2c extend out of the enclosure. The orientations of the molecules of the liquid crystal 30 are gradually twisted from the inner surface of the lower substrate section 109 to the inner surface of the upper substrate section 2. The segment electrodes 2a and the common electrodes 109a are connected with the terminals 2b and 2c. Polarizing plates (not shown) are disposed on the outer surfaces of the upper and lower substrates 2 and 109 and when a voltage is applied between the common electrodes 109a and selected ones of the segment electrodes 2a by supplying signals to the terminals 2b and 2c, the liquid crystal molecules in the regions corresponding to the selected segment electrodes are orientated in the direction of the established electric field to display patterns.

It is understood that although eight liquid crystal cells were produced according to the above described embodiments of this invention, this method can be easily extended without any appreciable modification to the case where more than 8 liquid crystal cells are to be fabricated. It is also understood that although in the previous embodiments a row of eight cells were integrally formed by a pair of a large-area glass substrates, but more than one row of cells may be integrally formed.

What we claim is:

1. A method for producing liquid crystal display elements, comprising the steps of:
    defining, with at least one boundary line, first regions and second regions disposed alternately on the surface of a glass substrate;
    forming transparent electrode segments having desired patterns on said first regions, and forming transparent electrodes having desired shapes on said second regions;
    forming layers of bonding agent, said layers having a predetermined width and thickness and extending within said second regions along said boundary line and the edge of said glass substrate;
    combining said glass substrate with another glass substrate prepared through all the above mentioned steps in such a manner that one substrate is kept at a predetermined distance from another and that said first regions of said one substrate are opposite to said second regions of said other substrate while said second regions of said one substrate are opposite to said first regions of said other substrate;
    forming a glass substrate assembly by bonding said glass substrates together through a heat treatment of said bonding agent;
    forming linear scratches in the surfaces of said glass substrates, said surfaces having no electrode formed thereon and said linear scratches corresponding in position to said boundary lines;

splitting said substrates along said linear scratches; and filling the spaces enclosed by said glass substrates and said bonding agent layers, with liquid crystal.

2. A method for producing liquid crystal display elements, as claimed in claim 1, wherein said step of splitting comprises a step of placing said glass substrate assembly on a supporting apparatus having two support members spaced a predetermined distance apart from each other and disposed substantially parallel with said linear scratches, in such a manner that a scratch in the surface of said assembly facing said supporting apparatus is at the midpoint between said support members and a step of bending said assembly by applying a pressing force onto the surface of said assembly not facing said supporting apparatus at or near the position corresponding to said scratch located at the midpoint between said support members.

3. A method for producing liquid crystal display elements, as claimed in claim 2, wherein said pressing force W kg per unit length in cm of the scratch is so chosen that $$0.6 < 1 \times W < 5.0$$

and $$75 < l/d < 100,$$

where l designates the distance between said support members of said supporting apparatus, measured in cm, and d designates the displacement, measured in cm, of said scratch located at the midpoint between said support members, perpendicular to the outer surface of said assembly, under application of the pressing force.

* * * * *